May 29, 1934.    L. HAMMOND    1,960,672
FREQUENCY INDICATING AND CONTROL APPARATUS
Filed Nov. 2, 1929    6 Sheets-Sheet 1

Fig. 1.

Inventor
Laurens Hammond
By Williams, Bradbury, McCaleb & Hinkle
Attys.

May 29, 1934.  L. HAMMOND  1,960,672
FREQUENCY INDICATING AND CONTROL APPARATUS
Filed Nov. 2, 1929   6 Sheets-Sheet 2

Inventor
Laurens Hammond
By Williams Bradbury
McCaleb & Hinkle Attys.

Patented May 29, 1934

1,960,672

UNITED STATES PATENT OFFICE 1,960,672

FREQUENCY INDICATING AND CONTROL APPARATUS

Laurens Hammond, Evanston, Ill., assignor, by mesne assignments, to The Hammond Clock Company, Chicago, Ill., a corporation of Delaware Application November 2, 1929, Serial No. 404,499

12 Claims. (Cl. 290—40)

My invention relates generally to frequency indicating and control apparatus and more particularly to apparatus of this type especially adapted for use in power generating stations which supply alternating current of regulated frequency for use in the operation of synchronous motor driven timing devices.

The apparatus of my invention is praticularly adapted to indicate whether an alternating current generator is operating at the proper frequency so that synchronous motor driven clocks supplied with current by the generator will indicate the correct time. Broadly, this is accomplished automatically by periodically comparing the speed of a synchronous motor supplied with current from the generator with an accurate time signal, indicating the sense and degree of variation and at the same time correctively controlling the generator speed.

In the devices previously devised for this purpose the standard clock usually has been connected to a synchronous motor (supplied with current by the generator being regulated) by means of differential gearing, the differential gearing having an indicator to show the relative speeds of the motor and the standard clock. In the use of such devices it is necessary to have a complete apparatus at each point where an indication is desired, whereas with my improved apparatus any number of widely separated indications of the frequency may be had. For example, the various persons in charge of a generating station may each have an indicator in his office and thus each one may be instantaneously apprized of any irregularity in the operation of the generator. Furthermore, in the devices as used in the past, where the synchronous motor and standard clock are connected by differential gearing, the indicator will never assume a steady position but will oscillate continuously due to the fact that a standard clock necessarily has an intermittent motion.

It is an object of my invention to provide an improved means for indicating by a stationary visual signal the amount of variation from the standard of the cumulative value of the frequency of current supplied by a generator.

A further object is to provide an improved means for governing the speed of a prime mover so that a generator driven thereby may supply alternating current of a frequency varying only slightly from the standard frequency.

A further object is to provide an improved governor for prime movers in which "hunting" is prevented.

A further object is to provide an improved system and apparatus for synchronizing an alternating current generator with a standard clock.

A further object is to provide an improved cumulative frequency indicator for alternating current systems in which a plurality of widely separated indicators may readily be controlled by a common mechanism.

Other objects will appear from the following description, reference being had to the accompanying drawings, in which.

Figure 1:
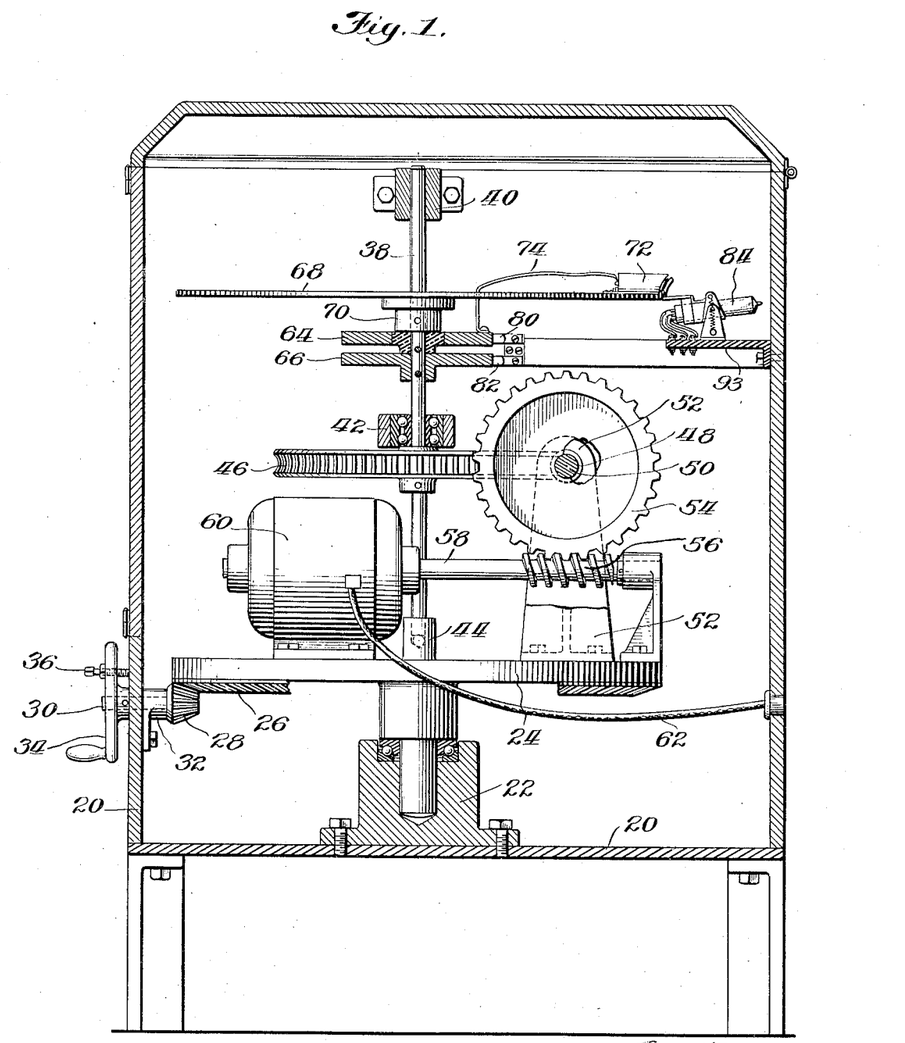
Fig. 1 is an elevation of a portion of my improved apparatus, parts thereof being shown in section.
Figure 2:
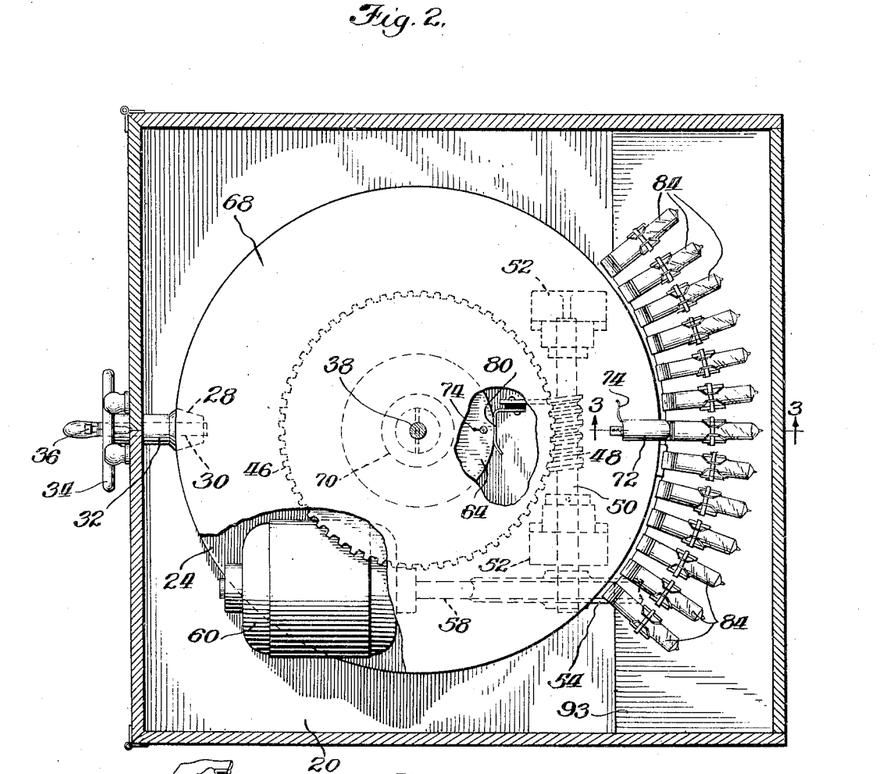
Fig. 2 is a plan view of the mechanism shown in Fig. 1, with the top of the casing removed.
Figure 12:
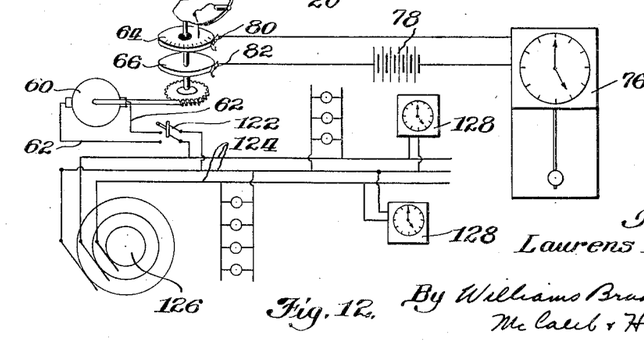
Fig. 12 is a wiring diagram showing the connections to the generator and to the standard clock.

As best shown in Figs. 1, 2 and 12, the apparatus of my invention comprises a suitable casing 20 having a thrust bearing block 22 secured to the base, the bearing supporting a turntable 24. The turntable 24 has a beveled gear 26 formed along its lower surface for meshing engagement with a beveled pinion 28 secured to a shaft 30 mounted in a bearing 32 secured to the casing. A handwheel 34 is secured to the shaft 30 and has means for locking it in set position, such means being diagrammatically represented as an adjustable set screw 36, the end of which engages the wall of the casing 20.

A spindle 38 is rotatably mounted in bearings 40, 42 and 44 and has a worm wheel 46 rigidly secured thereto. The worm wheel meshes with a worm 48 secured to a shaft 50 rotatable in a bearing 52. A worm wheel 54 secured to the shaft 50 meshes with a worm 56 secured to the shaft 58 of a synchronous motor 60. The latter is supplied with current through flexible conductors 62.

Non-rotatably secured to the spindle 38 is a pair of contact rings 64 and 66, the ring 64 being insulated from the spindle and the ring 66 electrically connected thereto. A disk 68 having a hub 70 is rigidly secured to the spindle 38 and carries an electromagnet 72 rigidly secured adjacent the periphery of the disk. One terminal of the electromagnet is connected to the disk while the other terminal is connected to contact ring 64 by a conductor 74.

At a periodic interval, such, for example, as one minute, a standard clock 76 (Fig. 12) closes a circuit from a source of current 78 to contact brushes 80 and 82 which are pressed against the contact rings 64 and 66, respectively. Assuming one minute to be the interval of the electric impulse from the clock 76, the speed reducing gearing between the synchronous motor 60 and the disk 68 will be of such ratio that the latter will rotate at a speed of one revolution per minute.

A plurality of mercury contact switches 84 are adapted to be operated by the electromagnet 72. Each of these switches comprises a tube 86 mounted in a suitable cradle 88, the latter having sidewardly projecting lugs 90 triangular in cross-section resting in suitable V-shaped notches formed in U-shaped supports 92 carried on a shelf 93.

Figure 3:
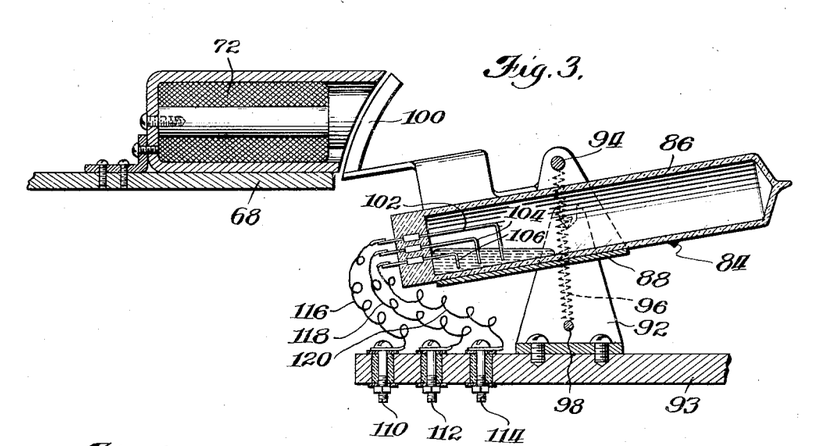
Fig. 3 is a vertical section of the mercury switch mechanism and is taken on the line 3—3 of Fig. 2.
Figure 4:
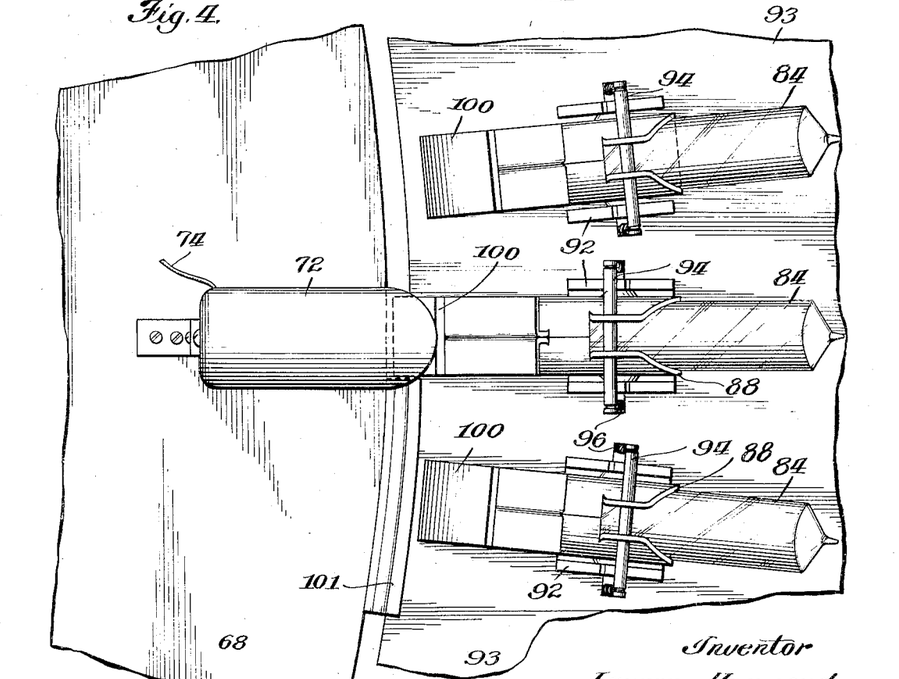
Fig. 4 is a plan view of some of the mercury switch mechanisms.
Figure 5:
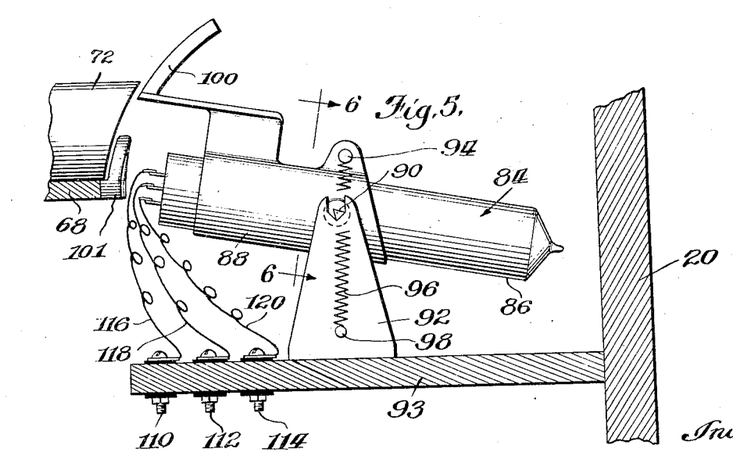
Fig. 5 is an elevation of one of said mercury switch mechanisms.
Figures 6, 7, 8:
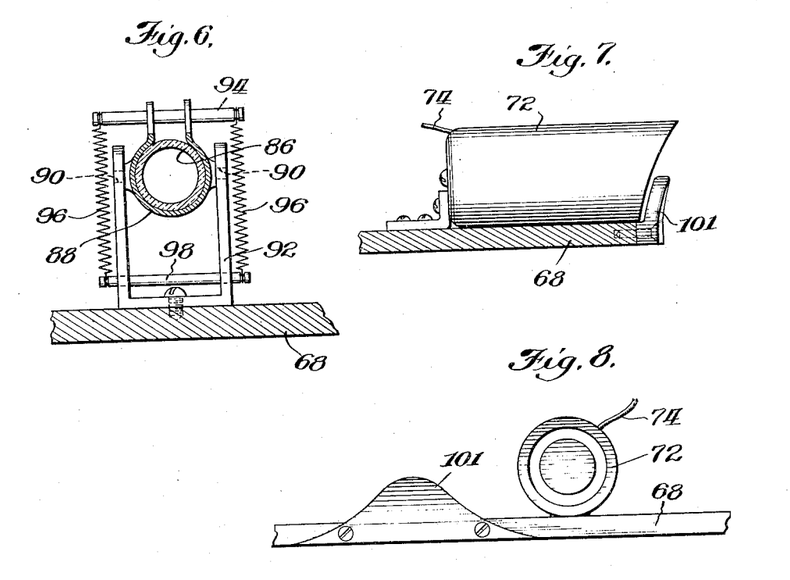
Fig. 6 is a sectional view taken on the line 6—6 of Fig. 5.
Fig. 7 is a side elevation of the electromagnet which operates the mercury switches.
Fig. 8 is an end elevation of said electromagnet, showing the position of the mercury switch restoring cam.

The cradle has a pin 94 secured thereto. Light springs 96 have their upper ends secured to the ends of the pin 94 and their lower ends secured to the ends of a pin 98 which is held in the support 92. These springs tend to hold the switch in either of its extreme positions, as indicated in Figs. 3 and 5, respectively. The cradle has an armature 100 secured thereto or formed integrally therewith, the armature being adapted to cooperate with the electromagnet 72. The disk 68 has a cam 101 secured thereto at a point a short distance in advance of the electromagnet 72, the cam being adapted to engage beneath one of the armatures 100 and move it from the position shown in Fig. 3 to the position shown in Fig. 5 once upon each revolution of the disk.

Each of the switches has three contacts 102, 104 and 106 located at one end of the tube 86 and adapted to be interconnected by a quantity of mercury 108 when the tube is in the position shown in Fig. 3. The contacts 102, 104 and 106 are connected to binding posts 110, 112 and 114 by flexible insulated leads 116, 118 and 120, respectively.

The conductors 62 which supply current to the synchronous motor 60 are adapted to be connected by a switch 122 (Fig. 12) with a three-wire main 124 which is supplied with current from an alternating current generator 126. The main lines 124 are representative of the current transmission system for general distribution of electric power. Synchronous motor driven clocks 128 are shown connected to the lines 124 and are representative of any number of secondary clocks supplied with current by the generator 126. For the sake of clearness, transformers, meters, circuit breakers and other control apparatus have been omitted from the diagram shown in Fig. 12.

From the above description it will be apparent that the disk 68 will be rotated in synchronism with the generator 126 and the gearing is such that when the generator is maintained at exactly the standard speed the electrical impulse sent out every minute from the standard clock 76 will energize the electromagnet 72 upon the completion of each revolution. If the generator has been running slow the disk 68 will not have been rotated through a complete revolution between the times when the impulses are received from the standard clock, while if the generator has been operating at a speed greater than standard the disk 68 will have rotated through more than one revolution during the interval between the impulses from the standard clock. Thus the position at which the electromagnet 72 is energized is a direct indication of the speed or frequency of the generator. As the electromagnet rotates past the armatures 100 of the mercury switches 84 and receives the impulse from the standard clock, the armature 100 of the mercury switch nearest the electromagnet at that time will be swung downwardly and the contacts 102, 104 and 106 interconnected by the mercury. The mercury switches are thus in effect relays which close circuits to indicators which will now be described.

Figure 11:
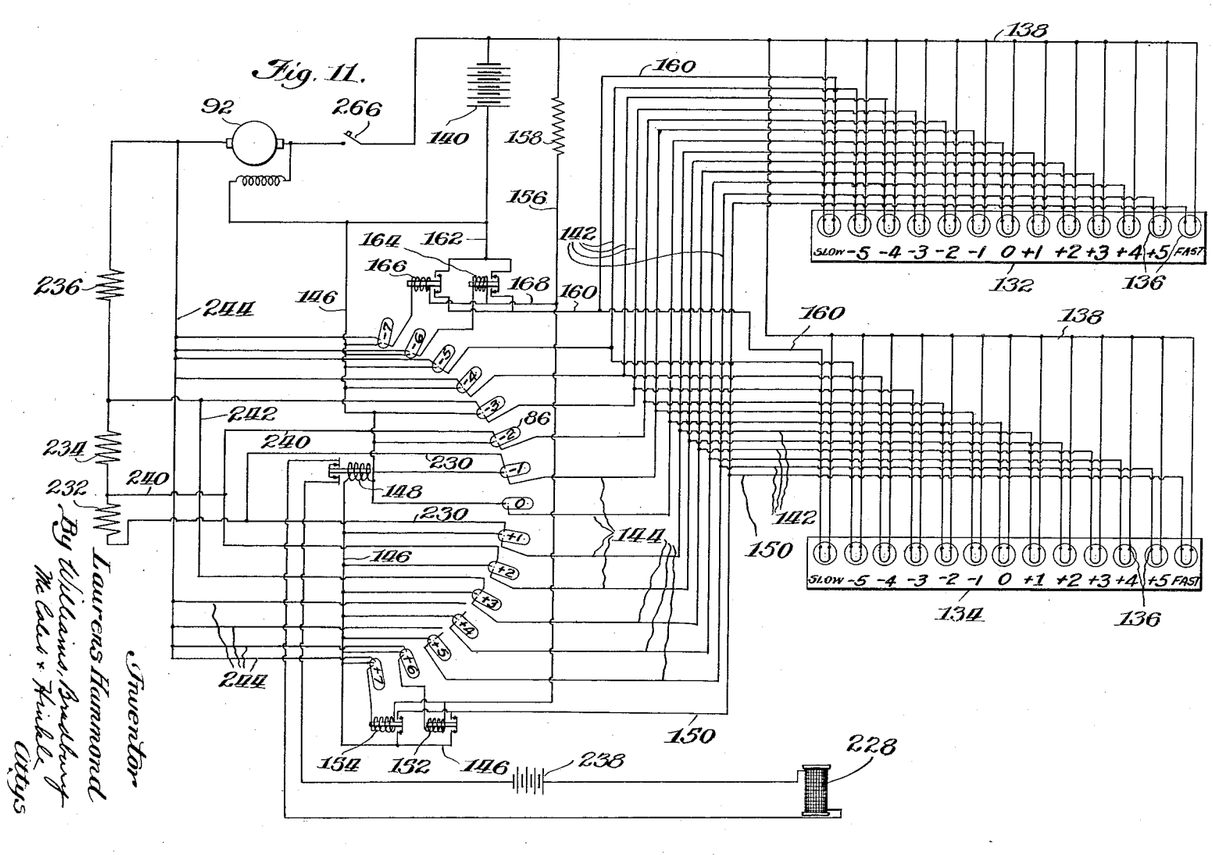
Fig. 11 is a wiring diagram showing the connections to the indicators and the electrical control for the governing mechanism.

In Fig. 11 the indicators are illustrated as panels 132 and 134, which, for simplicity's sake, are shown as comprising a plurality of lamps 136. One terminal of each of the lamps is connected to a common conductor 138 leading from a suitable source of current diagrammatically illustrated as a battery 140. The other terminals of the lamps 136, with the exception of the two end-most lamps, are each connected by conductors 142 and 144 to the terminal 110 of one of the mercury switches 86 which, in Fig. 11, are marked —5 to +5. The terminal 112 of each of the mercury switches is connected by a conductor 146 to the battery 140, said conductor including a winding 148 of a relay, the purpose of which will hereinafter be described.

The lamps 136 preferably have numbers —5 to +5 associated therewith and the two lamps at the ends of the panel are preferably marked "Slow" and "Fast", respectively. A conductor 150 is adapted to connect the terminal of the lamp 136 marked "Fast" with the conductor 146 upon the energization of either relay 152 or relay 154. Relays 152 and 154 are representative of any desired number of relays which may be provided to indicate differences greater than +5. The windings of these relays are adapted to be energized through the closing of mercury contact switches marked +6 and +7 respectively, the current flowing from the source 140 through conductor 146, winding 148, connected contacts 102, 104 of either switch +6 or +7, windings 152 or 154, conductor 156 and resistance 158, back to the source 140.

In a similar manner the conductors 160 are adapted to connect the terminals of the lamps 136 marked "Slow" with a conductor 162 upon energization of either relay 164 or 166. The conductor 162 is connected to the source of current 140. Relays 164 and 166 are adapted to be energized upon operation of the mercury switches "—6" and "—7", respectively. The current flow through the relays may be traced as follows: from the source 140, through conductor 146, through the contacts of one of the two mercury switches "—6" or "—7", through either the winding 164 or 166, conductor 168, conductor 156 and resistance 158, back to the source 140. The lamp 136 marked "Slow" will thus be illuminated when either the mercury switch "—6" or "—7" is operated.

From the above description it will be apparent that one of the lamps in each of the panels 132 and 134 will be illuminated throughout substantially the time taken for a complete revolution of the disk 68 and that the lamps illuminated will serve as a direct indication of whether the generator is operating at the standard speed, is lagging, or is ahead of the standard. It will be understood that the illumination of these lamps will be an indication of whether the cumulative number of revolutions of the generator is greater or less than the number of revolutions the generator would have had to make to have an average speed corresponding to the standard frequency.

In addition to thus indicating the generator speed, I have provided improved means for controlling or governing the generator speed so that compensation will automatically be made when the cumulative frequency of the current supplied by the generator is greater or less than the standard. These means are more or less diagrammatically illustrated in Figs. 9 and 10, in which 170 is a portion of a steam turbine representative of the prime mover driving the generator 126.

The steam for driving the turbine, or a portion of it, is admitted through a pipe 172 and is controlled by a valve 174. This valve is connected by a link 176 to a lever 178 mounted on a suitable pivotal support 180. The right-hand end (Fig. 9) of the lever 178 is pivotally connected to the sliding yoke 182 of a conventionally illustrated governor 184. The governor is driven by shaft 186 and bevel gears 188 from a shaft 190 rotated by the turbine drive shaft. An electric motor 192 is connected to a gear pump 194, the discharge conduit 196 of which is connected to the inlet opening of a three-way valve 198, to the outlets of which are connected pipes 200 and 202. These pipes are adapted to discharge into bucket-like containers 204 and 206, respectively, carried by lever 178 and located equal distances from the pivot 180. Each of these buckets has an open discharge pipe 208 and a relatively small discharge pipe 210 having a valve 212 for controlling the flow therethrough. Pipes 208 and 210 discharge into sumps 214 which are connected by drain pipes 216 with an inlet of the gear pump 194.

Figure 9:
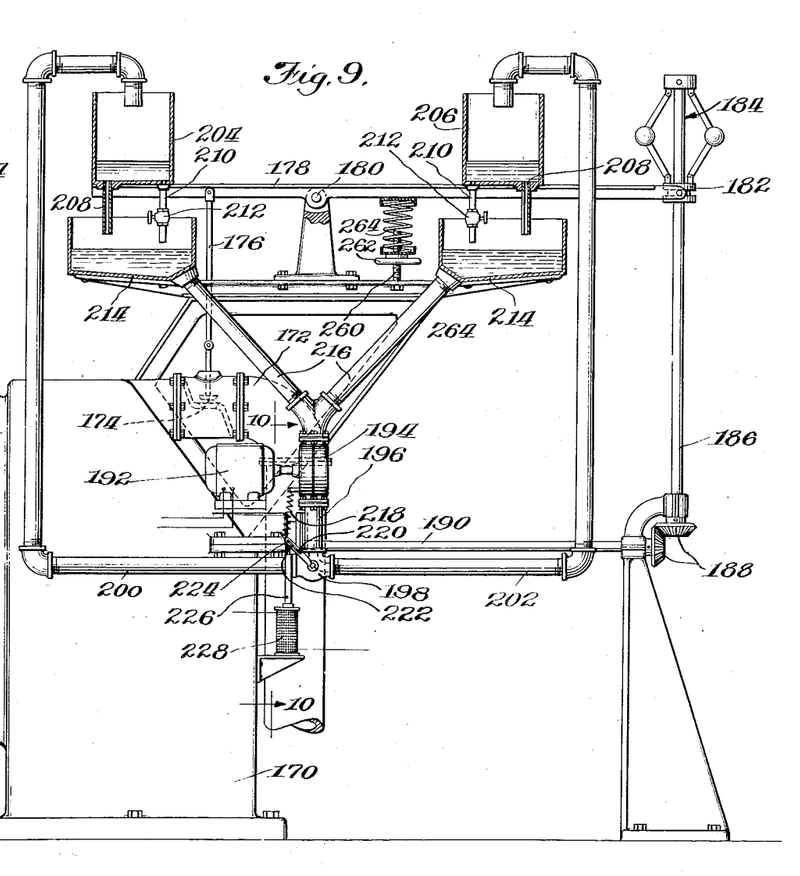
Fig. 9 is a somewhat diagrammatic elevation of the prime mover governing mechanism, parts thereof being shown in section.
Figure 10:
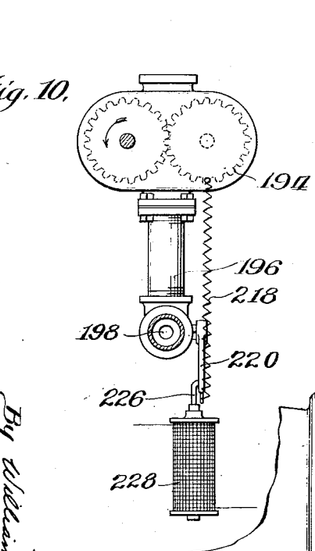
Fig. 10 is a detailed elevational view of the three-way valve operating mechanism.

The three-way valve 198 is normally held in the position shown in Fig. 9 by a spring 218, the upper end of which is suitably anchored, and the lower end of which is connected to the end of an arm 220. The latter arm is connected to the moving part of the valve 198 and has a slot 222 adapted to receive a pin 224 carried by a solenoid plunger 226 which is adapted to be drawn downwardly by a coil 228. When the valve is in the position shown in Fig. 9 and the motor 192 in operation, a liquid such as oil, contained in the sumps 214, will be forced through the pipe 196, valve 198, and pipe 202, into the container 206, from which it will drain through the pipe 208. The rate of flow from the container 206 may be adjusted by means of the valve 212.

The rate of flow into the container 206 will be sufficiently great that the oil will attain a certain definite level in the container before the rate of discharge through the pipes 208 and 210 exactly equals the rate at which the oil is flowing into the container. The weight of the oil in the container 206 will tend to pivot the lever 178 clockwise, thereby decreasing the effect of the governor 184 and tending to increase the opening of the steam valve 174 and, as a result, increasing the speed of the turbo-generator.

Upon energization of the electromagnet 228 the three-way valve will be shifted so that the discharge of oil from the pump 194 will be directed through the pipe 200 and into the container 204. The presence of oil in the container 204 will, due to its weight, tend to swing the lever 178 counter-clockwise, thereby tending to decrease the flow of steam through the valve 174. It will thus be seen that the rate of flow of steam to the turbine is controlled in part by the position of the three-way valve 198 and in part by the speed of the motor 192. With the solenoid coil 228 energized and the motor 192 running, the generator will tend to slow down, while when the solenoid coil 228 is deenergized and the motor 192 operating, the turbine will tend to increase its speed.

I have provided means, which will now be described, for automatically energizing the solenoid coil 228 and controlling the speed of the motor 192 to regulate the generator speed so that the cumulative frequency of the current supplied by the generator will be maintained very close to the standard.

The third terminal 114 of each of the mercury switches 84 is provided for controlling the motor 192 and the solenoid coil 228. For example, the mercury switches "+1" and "−1" each have their third terminal 114 connected by conductors 230 with a series of resistances 232, 234 and 236, which are, in turn, connected in series with the motor 192. Current from the source 140 is thus supplied through the conductors 146, through the contacts of the mercury switches and back through the conductors 230, resistances 232, 234 and 236 and motor 142 to the source. It will be noted, however, that the current flowing from the source 140 to the mercury switch "+1" passes through winding 148, whereas the current flowing from the source to the mercury switch "−1" does not flow through the winding of this relay. The relay 148 is adapted, upon energization, to close a circuit from a source 238 to the solenoid coil 228. The terminals 114 of the mercury switches "+2" and "−2" are connected by a common wire 240 to a point between the resistances 232 and 234. Upon operation of either of the switch "+2" or "−2" the motor will be operated at greater speed than when the switches "+1" or "−1" are operated due to the elimination of the resistance 232 from the motor circuit.

In a similar manner the terminals 114 of the mercury switches "+3" and "−3" are connected by a common wire 242 to a point between the resistances 234 and 236, thus eliminating the resistances 232 and 234 when either of the latter mercury switches is operated. The terminals 114 of the mercury switches "+4" to "+7" and "−4" to "−7" are connected by a common conductor 244 which leads directly to the motor 192 and the motor is thus operated at full speed when any one of the last-named switches is operated, since the resistances 232, 234 and 236 are eliminated from the motor circuit.

It will be noted that upon the operation of the "0" mercury switch the motor 192 will not be operated since there is no connection to the terminal 114 of said switch. Furthermore, upon the operation of any one of the switches "+1" to "+7" the relay 148 will be operated and the solenoid coil 228 energized, thereby shifting the three-way valve 198 to the position shown in Fig. 9.

The details of operation have been hereinabove described with reference to the specific structure and it is, therefore, believed that only a brief résumé of the operation will here be necessary.

The standard clock 76, or its equivalent, is preferably set so that it will at intervals of exactly one minute close the circuit to the electromagnet 72 for a brief interval in the nature of a quarter of a second. Instead of the standard clock 76 a radio signal operated relay may be used to close the circuit 78. The switch 122 is closed and the motor 60 thus set in operation at synchronous speed. Assuming the speed of the motor to be 1800 R. P. M., the speed reduction gearing shown is such that the speed of the disk 68 will be 1 R. P. M. When the parts are thus set in operation the turntable is adjusted by means of the hand-wheel 34 so that the circuit through the electromagnet 72 is closed approximately when it is opposite the mercury switch 86 designated "0" and the turntable located in this position by tightening the set screw 36. Thereafter the operation will be entirely automatic and will, under ordinary circumstances, require no further attention on the part of the operator.

Let us assume, for the purposes of illustration, that when the apparatus of my invention is put into operation the generator 126 is operating at a speed that the current delivered has a frequency of 59 cycles per second. If this is the case the disk 68 will not have made a complete revolution at the time the second energizing impulse is received by the electromagnet 72 and the electromagnet, instead of being opposite the armature of the mercury switch "0", will be opposite the switch "—1" and will actuate the latter switch while at the same time the cam 101 will restore the "0" switch to normal position.

The operation of the "—1" switch will cause illumination of the "—1" lamps 136 and thus indicate to the operator, as well as his superiors in whose offices one of the indicating panels may be located, that the generator is running slow. Operation of the switch "—1" will also close the circuit to the motor 192 through the conductor 230 and all three of the resistances 232, 234 and 236. The motor will operate at slow speed due to the interpositions of these resistances in its circuit and slowly pump the liquid from the sumps 214 into the container 206, since at this time the solenoid coil 228 will not be energized and the three-way valve 198 will be held in the position shown in Fig. 9 by the spring 218. The weight of the liquid pumped into the container 206 will tend to increase the opening of the steam valve 174 and thus slightly increase the speed of the generator.

In a similar manner, if the corrective factor thus applied to the turbine speed governing means is insufficient to increase the speed to compensate for the prior lag and the current generated still remains approximately 59 cycles per second, the electromagnet 72 will, upon its second revolution, be energized when it is opposite the mercury switch "—2", whereupon said switch will be operated, while at the same time the switch "—1" is returned to normal position by the cam 104. Operation of the switch "—2" will close the circuit to the motor 192 through the wire 240 and the speed of the motor thus increased due to the elimination of the resistance 232 from the motor circuit. The pump 194 driven by the motor will therefore pump oil into the container 206 at an increased rate, and the level of the oil in the container at which a state of equilibrium between the oil supplied to the container and that discharged through the pipes 208 and 210 is reached will be higher than previously and the lever 178 will tend to be rotated counter-clockwise with greater force and the steam valve 174 thus opened further. In a similar manner, if the generator fails to pick up speed the mercury switches "—3", "—4", "—5", "—6" and "—7" will be successively operated, the operation of the switch "—3" permitting further increased speed of the pump motor 192 and the operation of switches "—4" to "—7" permitting full speed operation of this motor. The constants and the proportions of the parts may be such that ordinarily the only switches operated will be the switches "—2" to "+2" or possibly "—3" to "+3", the switches "—4" to "—7" and "+4" to "+7" being provided merely for regulation of the generator under abnormal varying load conditions.

If, on the other hand, the turbine and generator are operating at, for example, 61 cycles per second instead of 60 cycles per second, when the apparatus of my invention is set in operation, the electromagnet 72 will be opposite the armature of mercury switch "+1" and the switch operated when the circuit through the electromagnet is closed at the end of the first minute of operation.

Operation of the mercury switch "+1" will close the circuits to the indicating lamps 136 marked "+1" and will, at the same time, close a circuit which may be traced as follows: from the source 140, conductor 146, relay winding 148, terminal 112 of switch "+1", through the contacts of said switch, terminal 114, conductor 230, through resistances 232, 234 and 236, and motor 192, back to the source 140. The flow of current through the relay winding 148 will close the circuit to the solenoid coil 228 and the latter thus energized will draw its core 226 downwardly against the tension of spring 218 and shift the three-way valve 198 to the position shown in Fig. 10, whereupon the pump 194, which is at this time operated at low speed by the motor 192, will force oil through the pipe 200 into the container 204. The oil will quickly attain a level in the container at which the rate of in-flow is the same as the rate of discharge through the pipes 208 and 210. The weight of oil in the container 204 will tend to swing the lever 178 counter-clockwise and decrease the opening of the steam valve 174.

In a similar manner, continued operation of the turbine generator at above normal speed will cause successive operation of the switches "+2" to "+7", the operation of each one of these switches shifting the three-way valve 198 to the position shown in Fig. 9, and the successive operation of these switches, with the exception of the last four, causing successive increases in the speed of the pump motor 192, and consequent increase in the height of the oil in the container 204 and resultant decreased opening of the valve 174.

As illustrated, the mercury switches 86 are spaced at intervals of 6° with reference to the axis of the spindle 38. The signal lamps are thus capable of indicating a lag or a lead of the cumulative frequency of the generator by one second intervals. If, however, the electromagnet should be energized by the standard clock when it is in a position intermediate two of the armatures of the mercury switches 86, it is possible that two of the switches may be operated and two of the lamps 136 illuminated. This, however, will merely serve as a more accurate indication since, when two of the lamps are illuminated, it will indicate that the lag or lead is about half way between the indications of the two lamps. The circuits for controlling the speed of the motor 192 are arranged so that the operation of two switches will have the same effect as if the switch having the greater absolute number had been operated.

Due to the method employed for governing the turbo-generator speed, the tendency of the turbine to hunt is eliminated since the use of the oil flowing through the containers 204 and 206 has a damping action upon any tendency of the turbo-generator to hunt. The governor control apparatus here disclosed is purely diagrammatic and is disclosed in this manner because the types of governors at present used in power generating stations vary greatly in the type of control used. The control circuits closed by the operation of mercury switches may, of course, readily be adapted to operate different means for changing the adjustment or regulation of the main governing apparatus. It will also be understood that the use of the automatic control is not essential to the efficient use of the indicating apparatus. For example, in Fig. 9 I have diagrammatically illustrated a manual means for adjusting or varying the effectiveness of the governing apparatus.

This means comprises a fixed screw threaded stud 260 upon which an adjustable hand-wheel 262 is mounted. The hand-wheel is adapted to adjust the initial compression of a coil spring 264, one end of which is seated upon the hand-wheel and the other end of which seats against the lever 178. Thus, by disconnecting a switch 266 (Fig. 11) the supply of current to the motor 92 may be shut off and the speed of the turbo-generator regulated by means of adjustment of the hand-wheel 262, the operator observing the indication on the panel 132 to determine whether the generator speed should be increased or decreased. The hand-wheel adjustment is, of course, diagrammatic and is intended to be representative of any other suitable apparatus for determining the generator speed.

The control apparatus may be modified in many respects to condition it for operation with particular types of governors. For example, the motor 92 may be made to operate continuously and its speed only varied, in which case the three-way valve 198 may be omitted and only one of the containers 206 and associated mechanism used. In this type of construction the operation will be substantially identical to that previously described with the exception that the relative dimensional and quantitative constants will be such that the zero switch 84 will cause operation of the motor at a speed just sufficient to maintain a level of oil in the container which will cause the governor adjustment to be in neutral position.

While the form of apparatus and mechanism herein shown and described is admirably adapted to fulfill the objects primarily stated, it is understood that it is not intended to confine the invention to the one form of the embodiment herein disclosed, for it is susceptible of embodiment in various forms, all coming within the scope of the claims which follow.

I claim.

1. In an alternating current frequency controlling apparatus, the combination of a synchronous motor connected to the alternating current source, an element moved by said motor, a plurality of control devices adjacent the path of movement of said element, and means for periodically conditioning said element to actuate one of said devices.

2. In an alternating current frequency controlling apparatus, the combination of a synchronous motor connected to the alternating current source, an element rotated by said motor, a plurality of control devices adjacent the path of movement of said element, means for periodically conditioning said element to actuate one of said devices, and a plurality of means connected for control by said devices, differentially to control the frequency of the alternating current source.

3. In a speed controlling apparatus, the combination of a member moved in synchronism with the part the speed of which is to be controlled, an element carried by said member, a plurality of control devices adjacent the path of movement of said element, means for periodically conditioning said element to actuate one of said devices, and means to differentially regulate the speed of said part by the operation of said devices.

4. In an alternating current generator speed control apparatus, the combination of an alternating current generator, an element moved in synchronism therewith, a plurality of switches each operable by said element, periodically operated means for rendering said element capable of operating one of said switches, a governor for controlling the speed of said generator, and means controlled by said switches to change the adjustment of said governor.

5. In an alternating current generator speed control apparatus, the combination of an alternating current generator, an electromagnet moved in synchronism therewith, a plurality of switches each having an actuating armature operable by said electromagnet, means for energizing said electromagnet at periodic predetermined intervals, thereby causing said electromagnet to operate one of said switches, a governor for controlling the speed of said generator, and means controlled by said switches to vary the effectiveness of said governor.

6. In an alternating current generator speed control apparatus, the combination of an alternating current generator, an element moved in synchronism therewith, a plurality of switches each operable by said element, periodically operated means for rendering said element capable of operating one of said switches, a governor for controlling the speed of said generator, a container having a restricted outlet and connected to said governor so that its weight will be effective in changing the operation of the governor, and means controlled by said switches to pump a liquid into said container.

7. In an alternating current generator speed control apparatus, the combination of an alternating current generator, an element moved in synchronism therewith, a plurality of switches each operable by said element, periodically operated means for rendering said element capable of operating one of said switches, a governor for controlling the speed of said generator, hydraulic means for varying the effectiveness of said governor, and means controlled by said switches to regulate the operation of said hydraulic means.

8. In an apparatus for controlling the speed of a prime mover, the combination of an electromagnet moved in synchronism with said prime mover, a plurality of control devices arranged along the path of movement of said element, a governor for said prime mover, hydraulic means cooperating with said governor to vary the effectiveness of the operation thereof, means controlled by said devices for regulating said hydraulic means, and means for periodically energizing said electromagnet.

9. In an apparatus for maintaining two rotating members in synchronism, the combination of an electromagnet moved in synchronism with one of said members, means for controlling the speed of said member, devices operable by said electromagnet, arranged in the path of movement thereof, and adapted to regulate said controlling means, and means to energize said electromagnet at intervals dependent upon the speed of the other of said members.

10. In an apparatus for controlling the speed of a prime mover, the combination of an element moved in synchronism with said prime mover, a plurality of control devices arranged along the path of movement of said element, a governor for said prime mover, a liquid container cooperating with said governor so as to vary the effectiveness of the operation thereof, said container having an opening in the bottom thereof, means for supplying a liquid to said container, means controlled by said devices for regulating said liquid supplying means, and means for periodically energizing said element for operating one of said devices.

11. In an alternating current frequency controlling apparatus, the combination of a synchronous motor connected to the source of alternating current, an electromagnet, means for moving said electromagnet in synchronism with said motor, a plurality of control devices located adjacent the path of movement of said electromagnet each having an armature operable thereby, means for periodically energizing said electromagnet to operate one of said devices, and means operated incidental to the operation of said devices for differentially controlling the frequency of the alternating current supplied from said source.

12. In an apparatus for controlling the frequency of current supplied from an alternating current source, the combination of a synchronous motor connected to said source, an element moved by said motor, a plurality of control devices adjacent the path of movement of said element, means for periodically conditioning said element to move one of said devices into operative position, means for restoring the moved device to normal position, and means for differentially regulating the frequency of the current supplied from said source, said last named means being controlled by said devices.

LAURENS HAMMOND.